April 22, 1952 R. R. TEETOR 2,593,936
WORK HOLDER FOR CYLINDRICAL ARTICLES
Filed Nov. 4, 1946 6 Sheets-Sheet 1

INVENTOR.
Ralph R. Teetor,
BY
Davis, Lindsey, Smith & Shonts
Atty's.

April 22, 1952 R. R. TEETOR 2,593,936
WORK HOLDER FOR CYLINDRICAL ARTICLES
Filed Nov. 4, 1946 6 Sheets-Sheet 3

INVENTOR.
Ralph R. Teetor,
BY
Davis, Lindsey, Smith & Shonts
Attys.

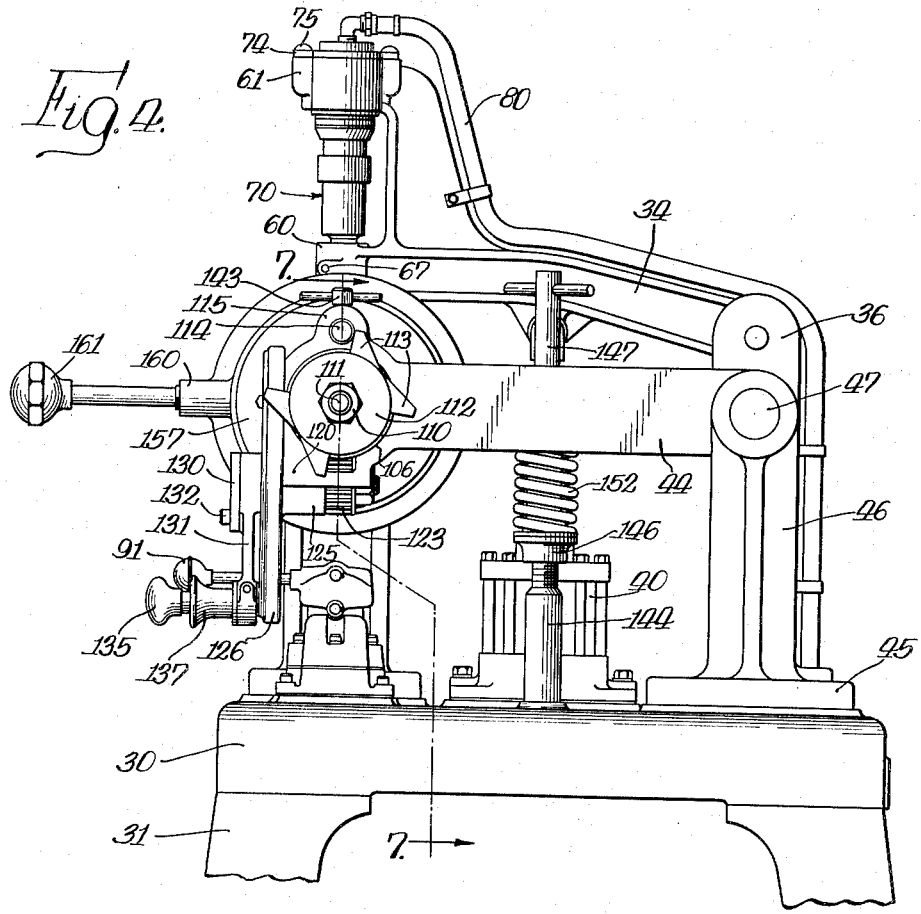
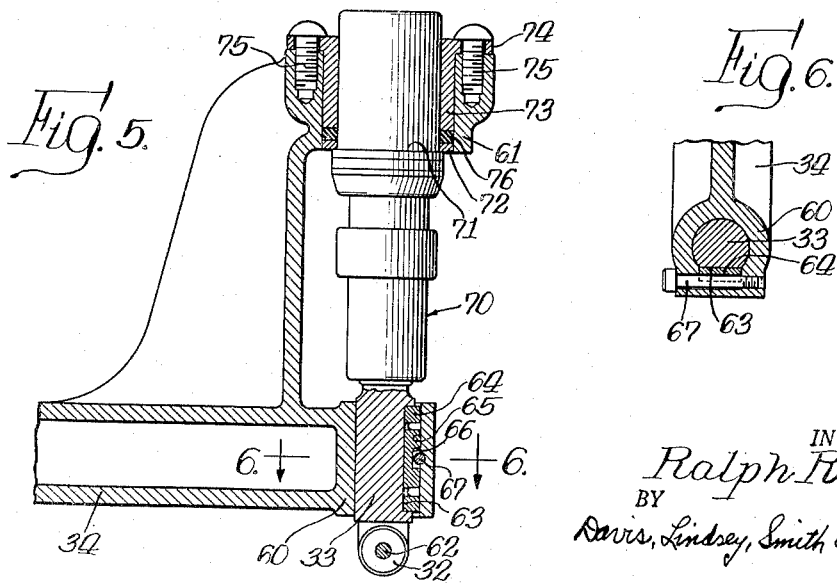

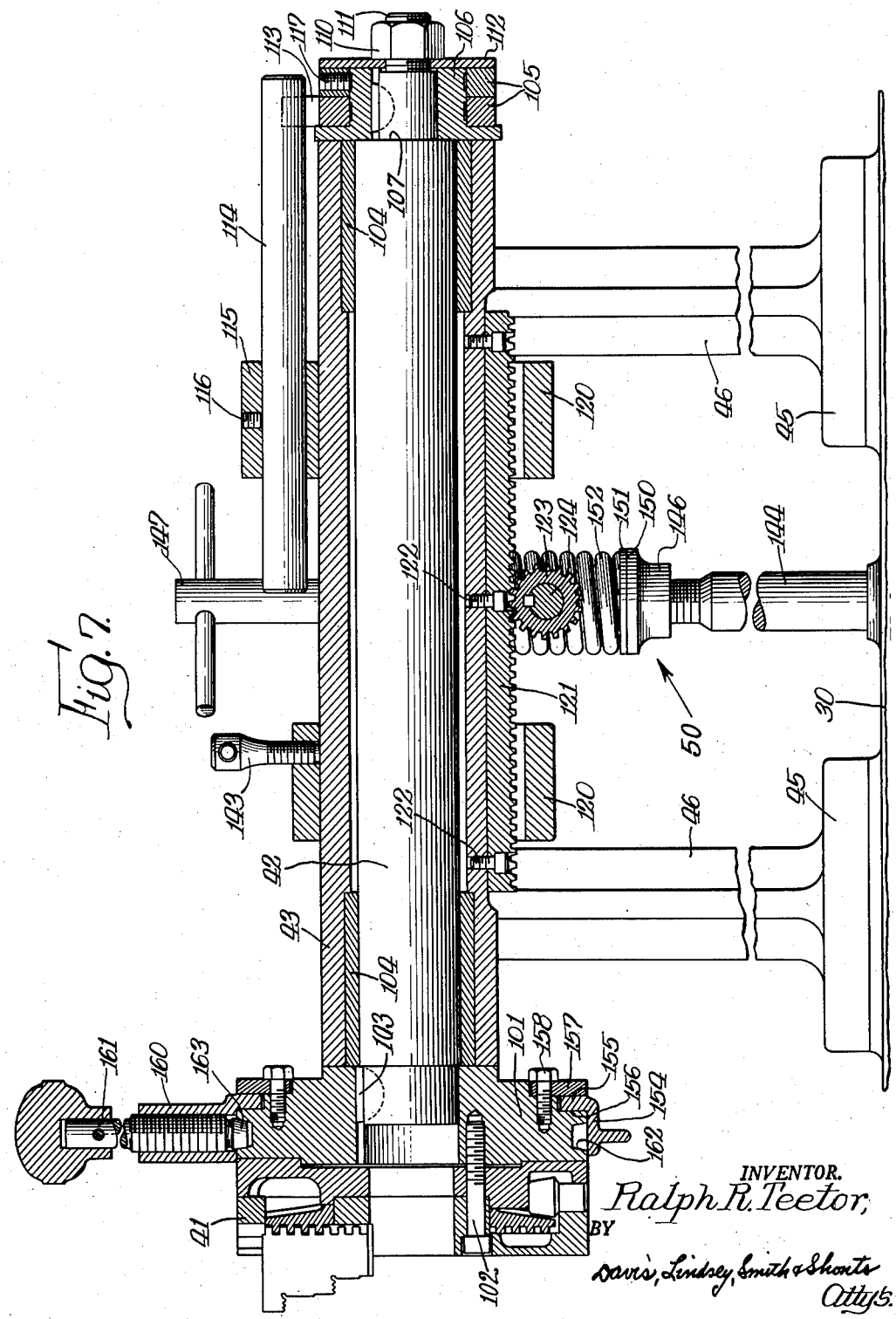

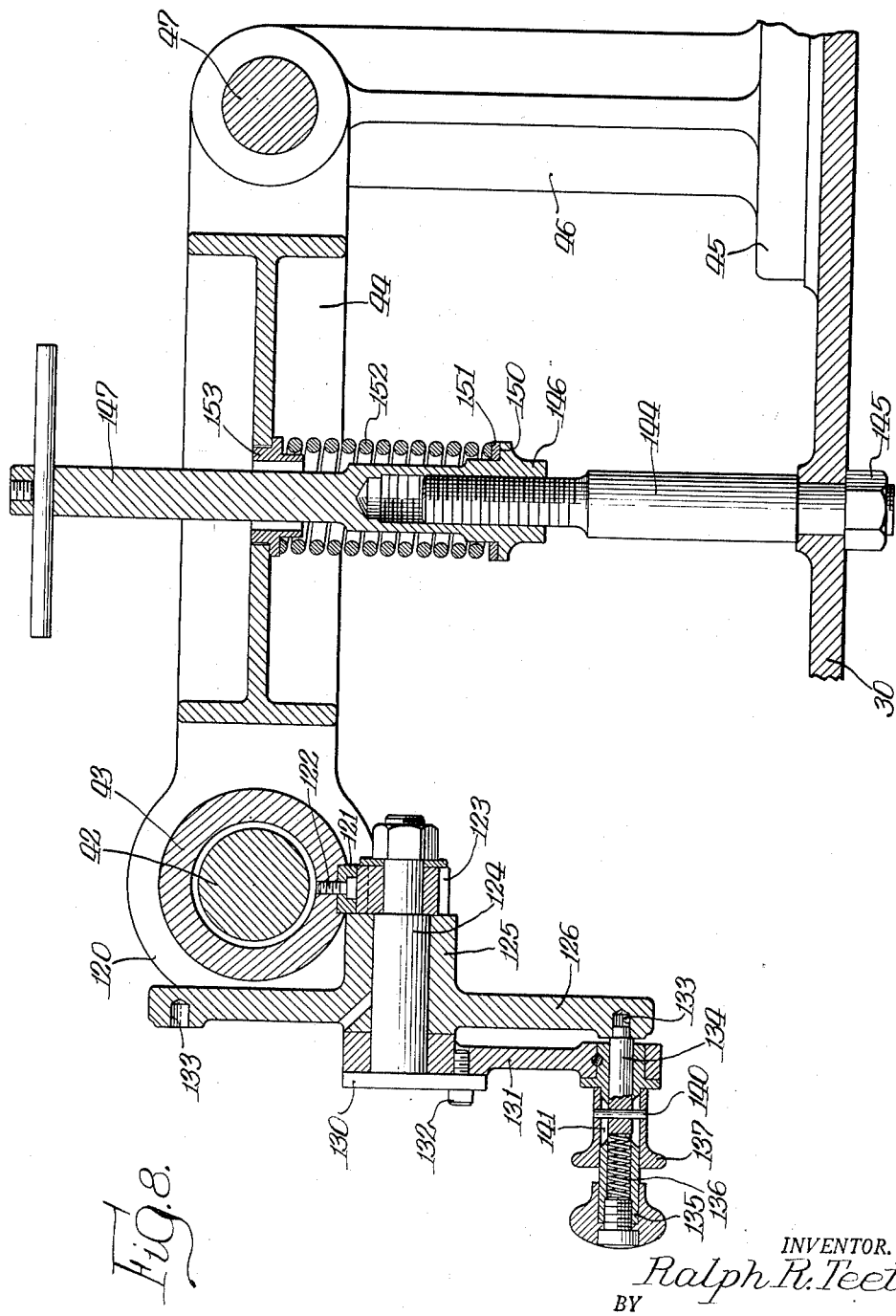

Patented Apr. 22, 1952

2,593,936

UNITED STATES PATENT OFFICE 2,593,936

WORK HOLDER FOR CYLINDRICAL ARTICLES

Ralph R. Teetor, Hagerstown, Ind., assignor to Perfect Circle Corporation, a corporation of Indiana Application November 4, 1946, Serial No. 707,746

8 Claims. (Cl. 90—59)

1

The invention relates generally to knurling machines and more particularly to a machine for knurling the peripheral surface, or predetermined portions thereof, of a hollow cylindrical article such as a piston for an internal combustion engine.

The general object of the invention is to provide a novel machine of the foregoing character, by which the knurling operation may be readily and accurately performed, which is adaptable to articles of various sizes, and which is adjustable to knurl peripheral areas of varying sizes.

Another important object is to provide a machine of the foregoing character, in which the knurling tool is applied to the article in a novel manner.

A further object is to provide a machine of the foregoing character, having novel supporting means in the nature of an anvil for the portion of the article on which the knurling tool acts, whereby any tendency toward distortion of the article by the pressure of the knurling tool is avoided.

Other objects reside in providing novel means for supporting the article when being acted upon by the knurling tool and permitting withdrawal of the work to a loading position, in providing for adjustment of said means to accommodate articles of varying sizes, in providing mechanism cooperating with said means to control the area which is knurled, in the control of the means for applying the knurling tool to the article, and in adjustment of the anvil supporting the portion of the article on which the knurling tool acts so that articles of different internal conformation may be accommodated.

Still another object is to provide a novel method of applying a knurling tool to the surface to be knurled.

Other objects and advantages will become apparent from the following description taken in connection with the accompanying drawings, in which:

Fig. 4 is an elevational view of the right-hand side of the machine as shown in Fig. 1.

Fig. 5 is a fragmentary vertical sectional view taken on the line 5—5 of Fig. 1.

Fig. 6 is a fragmentary sectional view taken on the line 6—6 of Fig. 5.

2

Fig. 7 is a fragmentary vertical sectional view taken on the line 7—7 of Fig. 4.

Figure 1:
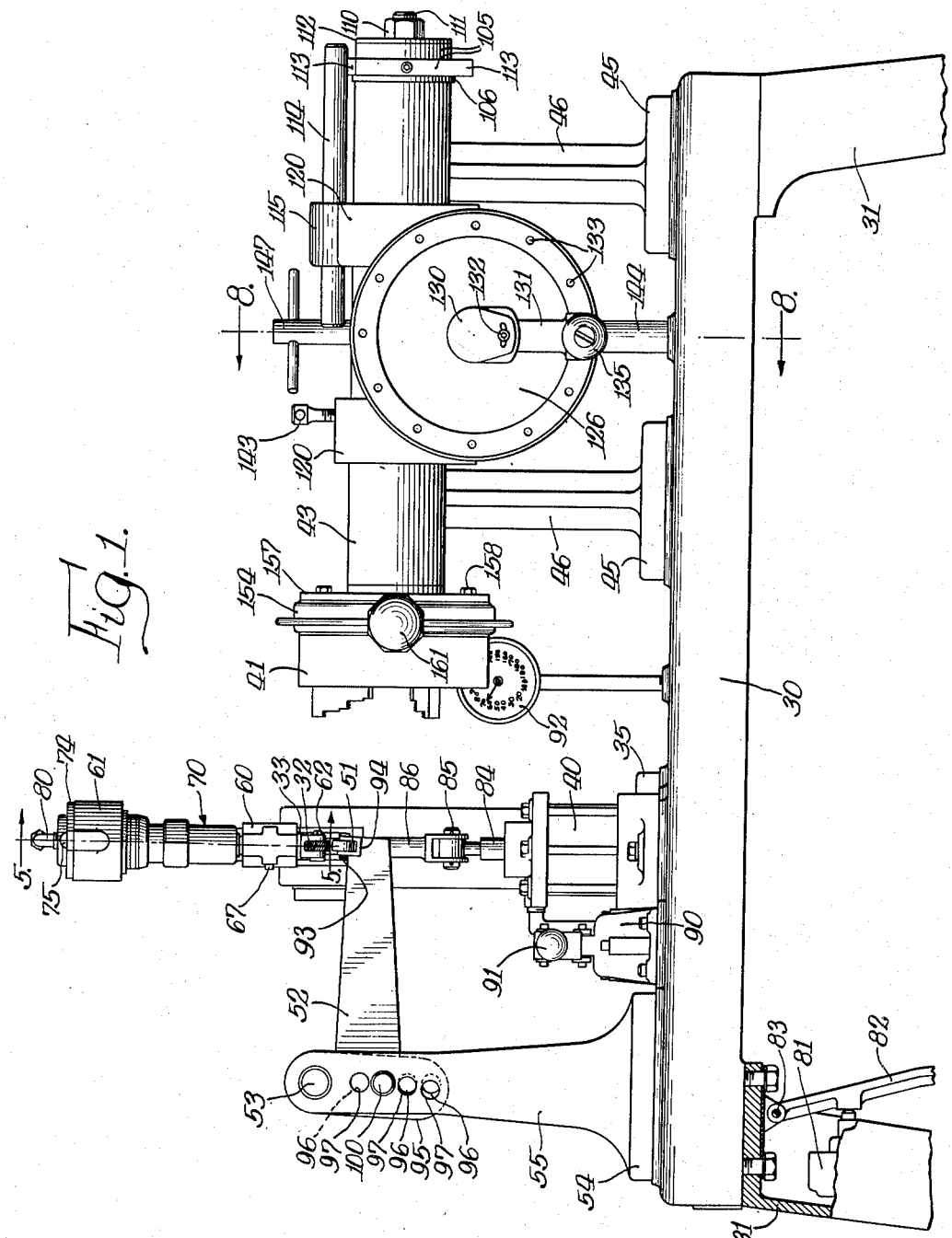
Figure 1 is a front elevational view of a knurling machine embodying the features of the invention.

Fig. 8 is a vertical sectional view taken on the line 8—8 of Fig. 1.

Figure 9:
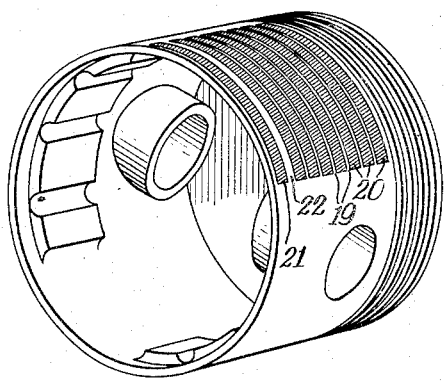

Fig. 9 is a perspective view of a piston knurled on the present machine.

It has heretofore been found that, with a cylindrical article adapted to reciprocate within a bore, such as in the case of a piston of an internal combustion engine, better lubrication can be obtained if either the piston or the bore within which it reciprocates has an interrupted surface, that is, a surface comprising projecting portions and intervening depressions. Apparently, oil is retained in the depressions to provide a supply immediately present in the entire interengaging area. A surface of this character has been provided on pistons by knurling the surface thereof, the knurling producing projections which are limited to and determine the surface of the piston contacting the bore of the cylinder. While, in some instances, the entire skirt area of the piston has been knurled, in other instances it has been found sufficient to knurl the thrust portions of the piston skirt, that is, those portions which are subjected to lateral thrust against the cylinder wall due to the angular position of the connecting rod during certain portions of the stroke of the piston. Original assemblies of pistons within their cylinders have been made in this manner to attain the above-mentioned advantage.

A further advantage can be obtained in repair work where the cylinders have been worn to some extent by the reciprocation of the piston. The knurling of the piston in this instance can be utilized not only to provide the interrupted surface facilitating lubrication, but also to increase the size of the piston to compensate for the wear incurred by the cylinder. Thus, in so knurling the piston, the metal thereof is extruded to a sufficient extent between depressions in the surface to cause the projections to extend to the desired increased size.

The present invention provides a machine for knurling cylindrical articles and, while it is designed primarily for knurling pistons, the invention is by no means limited in this manner but covers the knurling of the peripheral surface of any cylindrical article.

The term "knurling" as used throughout the specification and the claims is not limited to the ordinary form of knurling involving grooves arranged in a criss-cross pattern, but rather is used in a broad sense to include any surface formation involving alternate depressed and raised portions regardless of whether one or the other or both of said portions are continuous throughout the area having such formation. Thus, the term includes not only the cross-cross pattern but also a pattern formed by parallel grooves or by isolated indentations resulting in connected raised portions.

A machine embodying the features of the invention involves a novel method of performing the knurling operation, which method generally may be said to comprise an application of the knurling tool to the work under pressure and superimposing thereupon a hammering action which facilitates the formation of the projecting portions in the knurled area. While the machine may be utilized for knurling the entire peripheral surface of the cylindrical article, it is also provided with means for limiting the arcuate extent of the knurled area so that, in the case of pistons, the knurling may be placed only on that part of the skirt in the piston, which is subjected to thrust and consequent wear of the cylinder. The knurling tool is preferably in the form of a small roller applied in rolling relation with the surface to be knurled, the resultant knurled area or band due to one application of the knurling tool having a width equal to the width of the roller. Preferably, the roller is relatively narrow and is applied to the surface a plurality of times in order to cover the desired length of the piston. Thus, as shown in Fig. 9, where I have illustrated a piston knurled on the present machine, it will be noted that the knurled area is limited in arcuate length, and that the dimension of the area axially of the piston provides for a plurality of knurled bands 20 each of which is substantially equal to the width of the knurling tool or roller and together providing the total knurled area. The bands 20 are preferably located a short space apart, as indicated at 19, to avoid overlapping of the bands.

The knurled area preferably starts immediately below the lowest piston ring groove, that is, in the portion of the piston known as the skirt, and extends to the bottom of the piston. Because the width of the knurling roller is predetermined, it sometimes happens that a plurality of knurled bands 20 will not bring the knurling entirely to the bottom edge of the piston. Since it is desirable to have the lowest band of knurling substantially at the bottom edge, the lowest band of knurling, indicated at 21, may be spaced from the adjacent band a distance greater, as indicated at 22, than the normal spacing of the knurled band in the area above. For this purpose, the machine, which is arranged to effect a relative shifting movement between the work and the tool axially of the work to properly locate the various bands in predetermined steps, is also provided with means for shifting the work a distance different from one of such steps so that the lowest knurled band 21 may be placed in the desired location.

With the present machine, the work is adapted to be held in a holder which may be rotated to determine the arcuate length of the knurled bands and shifted axially, as above mentioned, to locate the knurled bands in predetermined steps. The work is additionally supported, however, by means in the nature of an anvil applied internally to the work at the point of application of the knurling roller. Such anvil provides for rigid support in the direction of the application of the force on the knurling roller. Since most pistons are castings and are provided with a certain amount of draft on their interior surfaces, the anvil is adjustable to accommodate any variation in the angle of draft. Thus, the anvil is preferably a roller which is adjustably supported so that it will bear squarely against the inner surface of the piston at the point of application of the knurling roller. Piston castings also frequently include protruding conformations on the interior thereof, such as wrist pin bosses, reinforcing ribs, and balancing lugs. These conformations may at times be engaged by the anvil during the rocking or turning movement of the piston when being knurled, resulting in a limitation on the arcuate length of the knurled area, unless the anvil roller is permitted to shift laterally of the piston or tangentially relative to the knurling roller. The present invention, however, provides a support for the anvil roller, which, while rigid in the direction of the line of force applied by the knurling tool, is resilient or yielding in a direction tangential of the knurling roller. Thus, when the anvil roller engages some conformation on the interior of the article tending to prevent rocking movement of the article, the anvil roller is permitted to flex or shift relative to the knurling roller so that the knurled area can be arcuately extended to the desired point.

Figure 2:
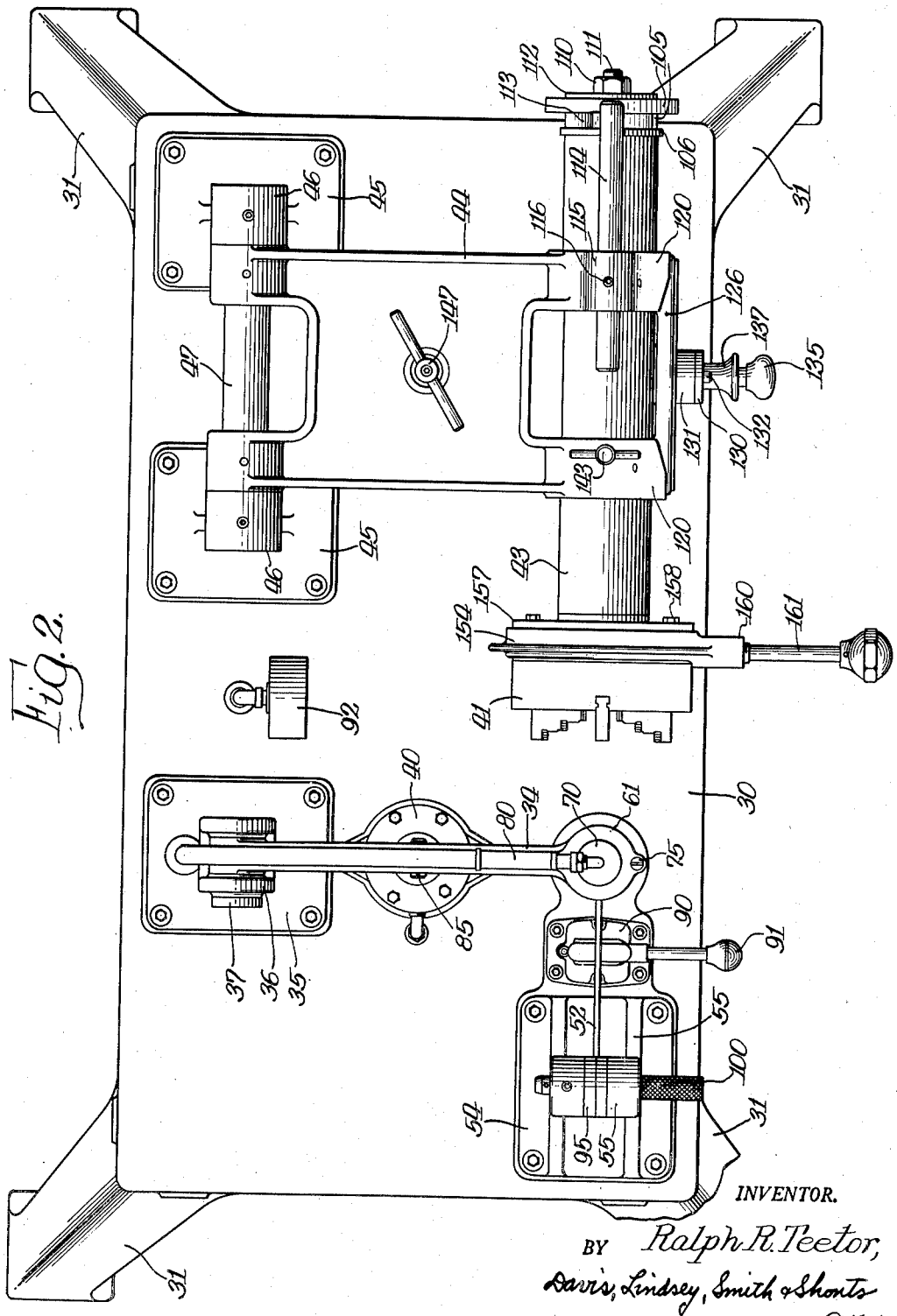
Fig. 2 is a plan view of the machine.

The preferred embodiment of the machine, as shown in Figs. 1 and 2, comprises generally a base which, in the present instance, is in the form of a table having a top 30, of generally rectangular form, supported by legs 31. The work piece is adapted to be held, during the knurling operation, at a point intermediate the sides of the table 30 adjacent the front edge thereof with the axis of the work piece horizontal and extending from side to side of the machine. The knurling tool is supported over the work piece and is adapted to be applied downwardly against the peripheral surface of the work piece. To this end, the knurling tool, which in the present instance comprises a roller 32, is carried by a holder 33 mounted in the forward end of an arm 34. The arm 34 is adapted to be raised and lowered toward and from the work and, for this purpose, is pivotally supported at its rear end by a bracket 35 having a bifurcated upright 36 between which the rear end of the arm is positioned and is carried by a pivot pin 37. The arm is adapted to be raised and lowered by power means, comprising in the present instance a pneumatic piston cylinder device 40 mounted on the table 30 forwardly of the bracket 35.

The work piece is primarily supported by a chuck, indicated generally at 41, carried by a spindle 42 (see Fig. 7) journaled in a quill 43 slidably mounted in a frame 44. The frame 44 provides for longitudinal movement of the quill 43 to shift the work from a loading position to a position under the knurling tool, and further to provide a step-by-step shifting of the work axially thereof to properly locate, in predetermined positions, the various knurled bands 20. The arcuate length of the knurled area is determined by rocking the spindle 42 within the quill 43 and thus rotating the work piece about its axis.

The frame 44 carrying the quill 43 is adapted to be raised and lowered to provide for work pieces of different diameters, and to this end is pivotally supported by a pair of brackets 45 mounted at the rear of the table 30 adjacent the right-hand side thereof, each bracket 45 having an upright 46 supporting a pivot pin 47 extending through the rear end of the frame 44. The vertical position of the frame 44 is determined by a resilient support, indicated generally at 150, which is adjustable for different-sized work pieces. The resilient support also permits shifting of the piston relative to the knurling roller to compensate for the slightly oval shape that internal combustion engine pistons normally have.

The anvil which supports the work piece interiorly at the point of application of the knurling roller 32, and which in the present instance is in the form of a roller 51, is preferably carried by an arm 52 extending from the left side of the table 30 into the interior of the work. The arm 52 is mounted on a pivot pin 53 carried by a bracket 54 having a bifurcated upright 55 between which the pivoted end of the arm 52 is positioned. The arm 52 is angularly adjustable about the pivot pin 53 so that the anvil roller 51 may be positioned to bear squarely against the interior surface of the work piece for any angle encountered therein. The anvil roller 51 is supported by the arm 52 in such a manner that rigid support is provided for the work piece in the direction of the force applied by the knurling roller 32 but is permitted to shift tangentially of the knurling roller, should some protruding conformation be encountered by the anvil roller, as described above. To this end, the arm 52 is in the form of a plate or strip extending in a vertical plane so that it provides rigidity in a vertical direction but is flexible horizontally from front to rear of the machine.

Figure 3:
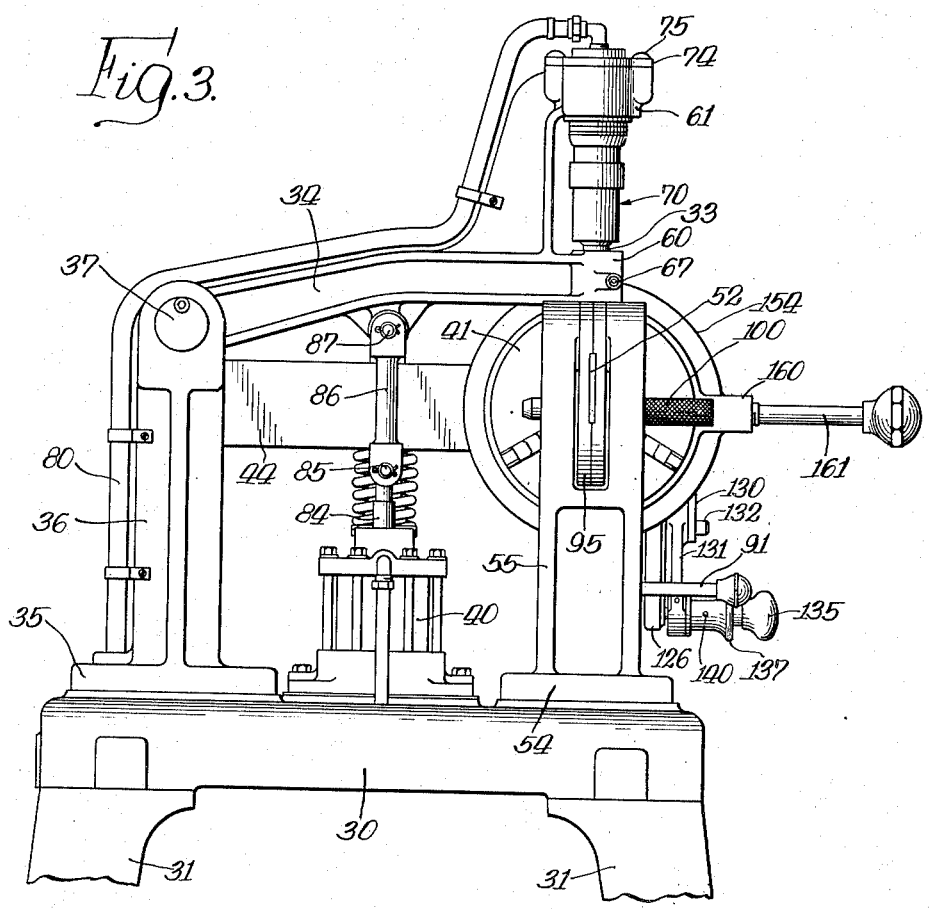
Fig. 3 is an elevational view of the left-hand side of the machine as shown in Fig. 1.

To describe the machine in more detail, the knurling roller 32, as mentioned above, is carried in the holder 33 (see Figs. 1, 3 and 5) mounted in the forward end of the arm 34. The forward end of the arm 34 is in the form of a yoke having a lower boss 60 and an upper boss 61. The holder 33 is bifurcated at its lower end and carries an axle 62 rotatably supporting the knurling roller 32. The holder 33, which is preferably round in cross section, extends through a bore in the lower boss 60 and is held against rotation but is longitudinally movable to a limited extent relative to the boss 60. For this purpose, the holder 33 is provided with a keyway 63 having a key 64 permanently secured therein as by welding. The boss 60, throughout its length, is provided with a corresponding keyway 65. To limit the longitudinal movement of the holder relative to the boss, the key 64 is provided with a transverse slot 66, and a set screw 67 of less diameter than the width of the slot 66 is threaded into the boss and extends into the slot. Thus, the holder 33 is permitted to move longitudinally relative to the boss 60 to an extent limited by engagement of the screw 67 with the sides of the slot 66.

As heretofore mentioned, the knurling roller 32 is applied to the work with a constant pressure and a hammering action is superimposed thereon. To this end, a hammer, indicated at 70, preferably of the pneumatic type, is mounted in the arm 34. In the specific structure shown, the hammer 70 is carried by the upper boss 61 of the arm and cushioning means is provided so that the reaction of the hammer blows will not be translated to the arm 34. As shown in the drawings, the upper end of the hammer 70 extends through a bore in the boss 61 and, adjacent the lower edge of the boss, the hammer is provided with an upwardly facing shoulder 71, against which a metal washer 72 is seated, the washer 72 being positioned within the bore of the boss 61. Encasing the upper end of the hammer 70 is a sleeve 73 telescoped within the boss 61 and having a flange 74 through which screws 75 extend to secure the sleeve 73 to the boss 61. The lower end of the sleeve 73 is spaced from the washer 72 and a cushioning means in the form of a rubber ring 76 is interposed therebetween. Thus, during the operation of the hammer, the reaction thereof is absorbed by the cushioning ring 76 to avoid impact thereof on the arm 34.

Air is adapted to be supplied to the hammer 70 through a hose 80 connected to the upper end of the hammer and extending rearwardly over the top of the arm 34 and thence downwardly through the table 30, the hose 80 being flexible so as to provide for the swinging movement of the arm 34. Below the table 30, the hose 80 is connected to a valve 81 preferably mounted in the leg 31 at the left front corner of the table. The valve 81 is connected to a source of air under pressure and is adapted to be controlled by the operator. In the present instance, the valve 81 is actuated by a knee lever 82 pivotally supported as at 83 to the upper end of the leg 31. The lever 82 extends downwardly and may readily be engaged by the knee of the operator when he is seated in front of the machine. Thus, the valve 81 may be actuated to control the supply of air to the pneumatic hammer 70 and thereby control the hammering action imposed upon the knurling roller 32.

The arm 34 is adapted to be swung in a vertical plane toward and from the work by the pneumatic actuator 40 mounted on the table 30 below the arm 34. The pneumatic actuator 40 comprises a piston and cylinder device having its piston rod, indicated at 84, pivotally connected as at 85 to a link 86 (see Figs. 1 and 3). The upper end of the link 86 is pivotally connected as at 87 to the arm 34 intermediate the ends of the latter. The piston and cylinder actuator 40 is controlled by a valve 90 mounted on the table adjacent the front edge thereof and having a control lever 91 extending forwardly therefrom. The valve 90 is connected to a source of air under pressure, and the valve is of the type having three positions, in one of which air is admitted to the lower end of the cylinder 40 to swing the arm upwardly, in another of which the air is admitted to the upper end of the cylinder to draw the arm 34 downwardly, and the third position being a neutral position for holding the arm in either of its aforementioned positions.

When the arm 34 is drawn downwardly, the pressure exerted by the piston and cylinder device 40 is exerted on the knurling roller by engagement of the end of the hammer 70 with the upper end of the work holder 33. Thus, the knurling roller may be held against the work with considerable pressure, constantly exerted, and at the same time a hammering action may be superimposed thereon through actuation of the pneumatic hammer 70.

The two valves 81 and 90 are preferably connected to the same source of air through a main supply line having a pressure regulator (not shown). A pressure gauge 92 is preferably mounted on the table at the rear central portion thereof to indicate the pressure established by the pressure regulator.

While the work piece is supported principally by the chuck 41, as heretofore mentioned, an auxiliary support in the form of an anvil is provided for support for the work at the point of the application of the knurling roller 32. Thus, the anvil, in the form of the roller 51 carried on the arm 52, provides the support at the point of application of the knurling tool. The anvil roller 51 is rotatably mounted on a pin 93 (see Fig. 1) carried in a fork 94 rigid with the end of the arm 52. The arm 52 is in the form of a plate providing rigidity in a vertical direction, as heretofore mentioned, but permitting flexing in a direction tangential to the knurling roller 32 so that, should the anvil roller 51 strike a boss or rib within the work piece which would tend to prevent further rotation of the work piece, the arm 52 may flex. The left end of the arm 52 is provided with a head 95 in the form of a pair of blocks riveted together and clamping the end of the arm 52 therebetween. The head 95 is pivotally supported at its upper end by the pivot pin 53 in the bifurcated upright 55 of the bracket 54.

The head 95 is adapted to be adjustably held in the upright 55 so that the anvil roller 51 may bear squarely against the inner surface of the work piece for varying angles of such surface. To this end, the head 95 is provided with a series of apertures 96 aligned with the pivot pin 53, while the upright 55 is provided with a similar series of apertures 97 but offset from a vertical center line through the pivot pin 53 by varying amounts. The apertures 96 and 97 are adapted to be successively brought into registration and a pin 100 inserted in the desired apertures to hold the head 95 in various fixed positions relative to the upright 55. Thus, the upper aperture 97 is so positioned that it is only slightly offset from the vertical center line to the pivot pin 53, while the apertures 97 therebelow are successively offset increasing amounts. With this arrangement, the arm 52 may be held at varying angular positions so that the anvil roller 51 may bear squarely against an interior surface in a work piece having a draft angle.

The main work support comprises a chuck 41 which may be of any desired form and is here shown as an ordinary three-jawed chuck adapted to engage the end of the cylindrical article to hold it in concentric relation with the chuck. In the case of pistons, the end of the piston which is grooved to receive rings is the part which is mounted within the chuck 41. The chuck 41 is secured to a head 101 (see Fig. 7) as by screws 102, and the head 101 is rigidly mounted on the end of the spindle 42 as by a key 103. The spindle 42, as heretofore mentioned, is journaled in the quill 43, bearings 104 being provided at the ends of the quill to support the spindle 42 in concentric relation therewith. The spindle 42 is adapted to be rocked about its axis to effect rocking movement of the work piece relative to the knurling roller 32. However, it is desirable to accurately control the arcuate lengths of the knurled bands 20 on the article. Usually the knurled bands 20 are all of the same arcuate length. For this reason, the rocking movement of the spindle is determined by limiting means rendered operative when the work piece is in knurling position, but preferably rendered inoperative when the work piece is moved back to loading position. The limiting means in the present instance preferably comprises a pair of rings 105 mounted on a flange member 106 keyed to the right-hand end of the spindle 42. The flanged member is held in abutment with a shoulder 107 on the spindle and against the end of the quill 43 to prevent any relative longitudinal movement between the spindle and the quill. In the present construction, the flanged member 106 is held in such position by a nut 110 mounted on a threaded portion 111 of the spindle and bearing against a washer 112 abutting the end of the flanged member 106. The washer 112 also holds the rings 105 in place on the end of the flanged member 106. The rings 105 are preferably held in adjusted position on the flanged member 106 as by set screws 117.

The rings 105 are each provided with a pair of radially extending lugs 113 (see Fig. 4) engageable with a fixed rod or bar 114 to limit the rocking movement of the spindle 42 and consequently the arcuate length of the knurled bands 20 on the work piece. The pair of lugs 113 on each ring 105 are diametrically opposite each other so that a set of lugs is provided for determining the arcuate length of knurling on one side of the piston, and another set of lugs providing the same spacing is provided 180 degrees therefrom. Consequently, the knurling on opposite sides of the work piece will have the same arcuate length. The rod 114 is adjustably mounted on the frame 44 by extending through a lug 115 formed thereon and being held in adjusted position as by a set screw 116. The rod 114 is preferably adjusted so that the lugs 113 engage it near its end for the final knurled band 21, that is, the knurled band nearest the left-hand end of the work piece when the work piece is mounted in the machine. In this way, the lugs 113 will be freed of the rod 114 so that the work piece may be turned through 180 degrees to present the other side thereof to the knurling roller, with a minimum of sliding movement of the quill 43.

As heretofore mentioned, the work piece is shifted axially to move it from a loading position to an operative position under the knurling roller and to shift it with a step-by-step movement to properly locate the respective knurled bands 20 by shifting the quill 43 longitudinally thereof in the frame 44. To this end, the quill 43 is slidably mounted in spaced bearings 120 (see Figs. 4, 7 and 8) formed on the end of the frame 44. Longitudinal movement of the quill is effected manually by means comprising a rack 121 rigidly secured to the lower side of the quill 43 as by screws 122. Meshing with the rack is a pinion 123 rigidly secured to a stub shaft 124 rotatably mounted in a hub 125 constituting part of a dial 126 integrally secured at its periphery to the bearings 120. The shaft 124 extends forwardly through the hub 125 and is provided with a head 130 at its front end. To rotate the shaft 124, and consequently the pinion 123, a hand crank 131 is mounted on the shaft and is adjustably secured to the head 130 as by a screw 132. Thus, the pinion 123 may be rotated by the hand crank 131 to shift the quill 43 longitudinally and move the work piece into and out of operative position relative to the knurling roller.

Since it is desirable to locate the knurled bands 20 on the piston at regularly spaced intervals, the quill 43 is adapted to be moved in predetermined steps so as to accurately and uniformly locate the respective bands 20. To this end, the dial 126 and the hand crank 131 are provided with cooperating means which determine the steps of movement of the quill. In the preferred form, the dial 126 is provided with a series of apertures 133 arranged about its periphery on the front face thereof, and the hand crank 131 is provided with a retractible pin 134 adapted to be moved selectively into engagement with the respective apertures 133. In the particular construction herein shown, the pin 134 is slidably mounted in a handle 135 rigidly secured to the end of the hand crank 131. A spring 136 is mounted within the handle 135 and bears against the pin 134, tending to move the pin into engagement with one of the apertures 133 when in registration therewith. To remove the pin 134 from one of the apertures 133, a finger-piece 137 is slidably mounted on the handle 135 and is connected to the pin 134 by a cross pin 140 extending through slots 141 in the handle 135. Thus, the finger-piece 137 may be drawn toward the end of the handle 135 to withdraw the pin 134 from one of the apertures 133 against the pressure of the spring 136, and when the finger-piece 137 is released, the spring 136 will move the pin 134 back into one of the apertures 133 when in registration therewith. The quill may thereby be moved longitudinally to shift the work relative to the knurling roller in predetermined steps determined by the position of the apertures 133 in the dial 126 and held in adjusted position by the pin 134 engaging in one of the apertures 133.

With pistons of different types and sizes, the area occupied by the ring grooves of the pistons vary and consequently the position of the first knurled band 20 adjacent the ring grooves varies. Since the dial 126 and its apertures 133 are fixed in their positions, the hand crank 131 is rendered adjustable angularly relative to the shaft 124 so that the first knurled band 20 may be positioned as desired. In the present instance, adjustment of the hand crank 131 relative to the shaft 124 is provided by an arcuate slot 142 (see Fig. 1) in the head 130 of the shaft 124. The screw 132 by which the hand crank 131 is secured to the head 130 extends through the slot 142 so that the hand crank 131 may be angularly adjusted relative to the shaft 124. Thus, in setting up the machine for knurling a given size and type of piston, the hand crank 131 is rotated to shift the quill 43 so that the piston is held in the desired position for the first knurled band 20 adjacent the piston ring grooves. The screw 132 is then loosened and the hand crank 131 is swung relative to the shaft 124 sufficiently to bring the pin 134 into registration with one of the apertures 133 in the dial 126. The screw 132 is then tightened to rigidly connect the hand crank 131 with the shaft 124. Thus, further rotation of the hand crank 131 through increments determined by the spacing between the apertures 133 will shift the work piece in the desired step-by-step movement to properly locate the respective knurled bands 20 thereon.

The knurled bands 20 on the piston are regularly spaced throughout the major portion of the length of the piston but, as heretofore mentioned, some pistons have a skirt length which is not even multiple of the spacing of the knurled bands. Since it is desirable to place the last knurled band 21 adjacent the bottom edge of the piston (left-hand edge when the piston is mounted in the machine), the spacing of the last knurled band 21 from the adjoining band may differ from the spacing of the other knurled strips as indicated at 22 in Fig. 9. Under such a circumstance, an aperture 133 in the dial 126 cannot be utilized for locating the quill, and the hand crank 131 will be positioned so that the pin 134 lies between two of the apertures 133. However, it is desirable to rigidly lock the quill 43 in position for the last knurled band 21. To this end, one of the bearings 120 in the frame 44 is provided with a set screw 143 (see Figs. 1 and 7) adapted to be tightened against the quill 43 to hold it against longitudinal movement.

The frame 44 carrying the quill 43 is adapted to be shifted so as to move the quill 43 vertically to properly position work pieces of different diameters relative to the knurling tool. To this end, the frame 44 is pivotally supported by the pivot pin 47 mounted in the brackets 45. It is also desirable to permit the frame 44 to yield in a vertical direction so that the work piece may be seated firmly on the anvil roller 51. In the present instance, an adjustable resilient support is provided for the frame 44 so that it may be shifted to a properly adjusted position for any size of work piece. As shown herein, the support comprises an elevating screw 144 (see Figs. 4 and 8) rigidly secured to the table 30 as by a nut 145 and extending vertically therefrom at a point intermediate the two ends of the frame 44. The upper end of the elevating screw 144 is threaded to receive a tubular nut 146 having a shank portion 147 extending upwardly through the frame 44 for adjustment by the operator. The nut 146 has a shoulder 150 on which a washer 151 is placed to provide a seat for a compression spring 152. The upper end of the compression spring 152 bears against a bushing 153 seated in an aperture in the frame 44. Thus, by rotating the nut 146, the latter is adjusted vertically on the elevating screw 144 to swing the frame 44 about its pivot pin 47.

The rocking movement of the spindle 42, to cause the knurling roller to roll on the surface of the work piece, is effected manually and, to this end, a ring 154 (see Figs. 1, 2 and 7) is mounted on the head 101 of the spindle 42. The ring 154 is rotatably secured on the head 101 against longitudinal movement relative thereto by a flange 155 on the ring 154 retained in a recess 156 in the head 101 by a ring 157 rigidly secured to the head 101 as by screws 158. The ring 154 at one side is provided with a radially extending boss 160 in which a handle 161 is threaded. To lock the ring 154 and the handle 161 to the head 101, the head 101 is provided with a tapered groove 162 in its periphery. The inner end of the handle 161 is similarly tapered as at 163 so that when it is screwed into the boss 160, the inner end 163 of the handle will wedge in the groove 162 and thus lock the ring 154 rigidly to the head 101. In this way, the handle may be adjusted about the spindle 42, particularly when the work piece is turned through 180 degrees to knurl opposite sides thereof.

While the operation of the machine will be apparent from the foregoing description, a brief statement relative thereto may be made at this point. In setting up the machine to handle a given size piston, for example, the piston is placed in the chuck 41 with the grooved end of the piston located in the chuck. The nut 146 is then adjusted vertically so as to properly position the piston relative to the anvil roller 51. Preferably, the nut 146 is adjusted to a position where the frame 44 tends to hold the work piece somewhat above the anvil roller 151 but will be depressed sufficiently under the pressure exerted by the pneumatic actuator 40 to hold the skirt of the piston in engagement with the anvil roller 51. The collars 105 are rotatably adjusted on the end of the spindle 42 so that the lugs 113 will engage the bar 114 to limit the arcuate length of the knurled strips to that desired.

The quill 43 is then adjusted longitudinally to bring the first knurled band adjacent the ring grooves in the piston. To accomplish this, the screw 132 is loosened and the hand crank 131 is swung relative to the shaft 124 to bring the pin 134 in registration with one of the apertures 133 in the dial 126 when the quill is properly positioned for the first knurled band. The screw 132 is then tightened to hold te crank 131 rigid with the shaft 124. The arm 52 carrying the anvil roller 51 is also adjusted angularly, by inserting the pin 100 in the proper holes 96 and 97, so that the anvil roller 51 bears squarely against the inner surface of the piston. The machine is then ready for performing the knurling operation.

In the knurling operation, the hand crank 131 is turned sufficiently to bring the pin 134 into registration with the aperture 133 corresponding to the first knurled band 20, and the pin 134 is permitted to enter the aperture 133 under pressure of the spring 136 to rigidly hold the hand crank 131, and consequently the work piece, in position. The spindle 42 is rocked by means of the handle 161, the rocking movement being limited by the lugs 113 on the rings 105 engaging the bar 114 to determine the arcuate length of the knurled band. The valve 90 is, of course, actuated by the lever 91 to cause the pneumatic actuator 40 to draw the tool supporting arm 34 downwardly to bring the knurling roller into operative engagement with the work piece. The knee-actuated lever 82 is also operated to cause the valve 81 to supply air to the air hammer 70 and thus superimpose a hammering action on the knurling roller 32 in addition to the constant pressure exerted thereon through the arm 34. Should the anvil roller 51 encounter any obstruction in the interior of the piston which would tend to prevent full rocking movement of the spindle 42, the arm 52 flexes sufficiently so that the full arcuate length of the knurling may be performed. After one knurled band is completed, the hammering action of the hammer 70, of course, is stopped and the arm 34 is raised by means of the pneumatic actuator 40. The hand crank 31 is then rotated through the distance between the adjacent apertures 133 and relocated in such position by means of the pin 134. This positions the work piece so that the knurling tool is ready to perform the next knurling operation. When it comes to the last knurled band 21 adjacent the lower end of the skirt of the piston, the pin 134 is released from the aperture and the hand crank 131 is turned a sufficient distance to locate the last knurled band in the desired position. The quill 43 is then locked by the set screw 143.

While the pressure of the knurling roller 32 on the work piece constantly applied by the pneumatic actuator 40 is sufficient to produce a knurling action as the work piece is rocked, the hammering action of the hammer 70 superimposed upon such pressure produces an exceptionally sharp knurl with the raised portions between the grooves of the knurl fully conforming to the contour of the knurling roller. Thus, the protruding portions of the metal in the work piece will all be uniform to maintain a desired dimension on the work piece. This is particularly important in the case of pistons for internal combustion engines since the protruding portions determine the outside dimension of the piston and consequently must be properly related to the diameter of the cylinder bore in which the piston reciprocates.

I claim:

1. A work holder for supporting a hollow generally cylindrical article while predetermined areas are being knurled on the peripheral surface thereof, comprising means for supporting the article for rotation about its axis, an anvil for interiorly supporting said article and comprising a roller having its peripheral surface adapted to engage the inner surface of said article, an arm supporting said anvil roller, a bracket pivotally supporting said arm for adjustment substantially in a plane through the axis of the article at the point of application of the roller against the article whereby to adjust the anvil roller so that it bears squarely against the inner surface of the article, and a pin insertible in registering apertures in said arm and bracket to hold the arm in adjusted position.

2. A work holder for supporting a hollow generally cylindrical article while predetermined areas are being knurled on the peripheral surface thereof, comprising means for supporting the article for rotation about its axis, an anvil for interiorly supporting said article and comprising a roller having its peripheral surface adapted to engage the inner surface of said article, and an arm supporting said anvil roller and comprising a flat strip extending substantially in a plane through the axis of the article and the point of application of the roller to the article, said strip rigidly supporting the anvil against movement in said plane but being adapted to flex transversely when the anvil roller encounters protruding conformations on the interior of the article during rotation of the article.

3. A work holder for supporting a hollow generally cylindrical article while predetermined areas are being knurled on the peripheral surface thereof, comprising a spindle arranged to support the article coaxially therewith, means for rotatably supporting the spindle to rock the article about its axis, and adjustable means for limiting the rotation of said spindle comprising a bar mounted on said supporting means and extending parallel to said spindle, and a pair of collars rotatably adjustable on said spindle and having radially extending lugs adapted to engage said bar to limit the rocking movement.

4. A work holder for supporting a hollow generally cylindrical article while predetermined areas are being knurled on the peripheral surface thereof, comprising a support, a quill movable longitudinally in said support to move the article into and out of operating position, a spindle rotatably mounted in said quill arranged at one end to support the article coaxially therewith and projecting at its other end beyond the quill, a bar mounted on said support and extending parallel to said spindle, and a pair of collars rotatably adjustable on said other end of the spindle and having radially extending lugs adapted to engage said bar to limit the rocking movement when the article is in operating position, said lugs being positioned beyond the end of said bar when the article is moved out of operating position to permit the spindle to be freely rotated.

5. A work holder for supporting a hollow generally cylindrical article while predetermined areas are being knurled on the peripheral surface thereof, comprising a rockably mounted spindle, a head mounted on the end of said spindle and having a tapered groove in its periphery, a chuck secured to said head to hold the article coaxial with said spindle, a ring mounted on said head for rotative adjustment, and a handle for rocking said spindle threaded radially in said ring and having a tapered end adapted to wedge in said groove to lock said ring to said head.

6. A work holder for supporting a hollow generally cylindrical article while predetermined areas are being knurled on the peripheral surface thereof, comprising a spindle having means on one end thereof for supporting the article coaxially therewith, means for rotatably supporting the spindle to rock the article about its axis, and adjustable means for limiting the rotation of said spindle comprising a bar mounted on said supporting means and extending parallel to said spindle, and means carried by the spindle and providing circumferentially spaced lugs adapted to engage said bar to limit the rocking movement of the spindle.

7. A work holder for supporting a hollow generally cylindrical article while predetermined areas are being knurled on the peripheral surface thereof, comprising a spindle having means on one end thereof for supporting the article coaxially therewith, means for rotatably supporting the spindle to rock the article about its axis, and adjustable means for limiting the rotation of said spindle comprising a bar mounted on said supporting means and extending parallel to said spindle, and means carried by the spindle and providing two pairs of circumferentially spaced circumferentially adjustable abutments engageable by said bar to limit the rocking movement of the spindle and thereby limit the circumferential length of the knurled areas, said pairs of abutments being spaced 180° from each other to locate the knurled areas diametrically opposite each other.

8. A work holder for supporting a hollow generally cylindrical article while predetermined areas are being knurled on the peripheral surface thereof, comprising spindle means including a rockably mounted spindle and a head mounted on the end of the spindle, said spindle means having a socket in its periphery, a chuck secured to said head to hold the article coaxial with said spindle means, a ring mounted on said spindle means for rotative adjustment, and a handle for rocking said spindle means mounted for radial movement in said ring and having an end adapted to cooperate with said socket to lock said ring to said spindle means.

RALPH R. TEETOR.

REFERENCES CITED

The following references are of record in the file of this patent:

UNITED STATES PATENTS

| Number | Name | Date |
|---|---|---|
| 409,049 | Lewis | Aug. 13, 1889 |
| 893,954 | Van Huffel | July 21, 1908 |
| 1,292,494 | Lorenz | Jan. 28, 1919 |
| 1,399,525 | Schaad | Dec. 6, 1921 |
| 1,923,477 | Coda | Aug. 22, 1933 |
| 1,982,209 | Gary | Nov. 27, 1934 |
| 1,988,738 | Johnson | Jan. 22, 1935 |
| 2,026,666 | Benham | Jan. 7, 1936 |
| 2,085,963 | Ferm et al. | July 6, 1937 |
| 2,153,863 | Fall | Apr. 11, 1939 |
| 2,237,583 | Birkigt | Apr. 8, 1941 |
| 2,285,688 | Stull | June 9, 1942 |
| 2,308,493 | De Rentiis | Jan. 19, 1943 |
| 2,312,225 | Wilkinson | Feb. 23, 1943 |

FOREIGN PATENTS

| Number | Country | Date |
|---|---|---|
| 157,605 | Great Britain | Nov. 16, 1922 |